United States Patent Office 3,667,974
Patented June 6, 1972

3,667,974
PROCESS FOR PREPARING A MOLDED PITCH-POWDER GRANULE SYSTEM WITH AN IMPROVED BONDING MATERIAL AND PRODUCTION PRODUCED THEREFROM
Kaoru Umeya, Sendai-shi, Akira Watanabe, Okayama, and Shinpei Gomi, Tokyo, Japan, assignors to Kureha Kagaku Kogyo Kabushiki Kaisha, Tokyo, and Kyushu Taika Renga Kabushiki Kaisha, Okayama, Japan
No Drawing. Filed June 12, 1969, Ser. No. 832,812
Claims priority, application Japan, June 12, 1968,
43/39,898
Int. Cl. C04b 35/02, 35/04
U.S. Cl. 106—58         7 Claims

ABSTRACT OF THE DISCLOSURE

A refractory which is high in compressive strength at both room temperature and at high temperatues in softening point under load, and in resistance to slags can be economically obtained by compression molding as a first embodiment a mixture comprising 100 parts of powder granules 1 to 30 parts of a special pitch prepared by heating any hydrocarbon containing crude oil at 700° to 2300° C. for a short time and further heat treating the resulting tarry materials at 150° to 550° C. As a second embodiment 100 parts of powder granules are admixed with special pitch and less than 70% of an aromatic tar which has been likewise heated at 700° to 230° C. for a short time, and then further heated at 150° to 550° C.

BACKGROUND OF THE INVENTION

In conventional processes for molding of a pitch-powder granule system, tar dolomite refractory, coal tars, pitches, petroleum tars, asphalts, or blends of coal or petroleum oils therewith have hitherto been used as bonding agents. However, for the tar dolomite refractory, the above bonding materials are unsatisfactory for use in the manufacturing step and produce refractories of undesirable properties. A satisfactory bonding material for use in a steel converter must be able to withstand the erosion effects of molten steel slag in a reduction atmosphere at a temperature of 1600° to 1700° C.

When using conventional tars and asphalts of petroleum as a bonding material, under the conditions of manufacturing a tar dolomite refractory, the tars and asphalts vigorously decompose and are scattered, and are therefore unsuitable bonding materials. There is also little survival of carbon in the refractory, which is desirable for this kind of refractory.

It is known that when carbon survives in a refractory, such is not easily wetted by slags and molten steels, and hence erosion is inhibited, thereby increasing the life of the refractory.

Alternatively, when using tars and pitches of coal, the above defects are considerably reduced but not sufficiently so, as numerous carbonaceous materials are scattered in the reduction atmosphere at a high temperature and a cavernous phenomenon occurs, i.e. a decarbonized layer is formed to give a cavity within the refractory during use, and therefore it is not satisfactory.

Accordingly as a first embodiment of the present invention it has been found that pitches having an abundance of aromatics and a relatively high molecular weight have a high carbonization rate in the heating step, and hence are suitable as a bonding material for the above refractory. Particularly it has been found that a molding pitch-powder granule system having extremely excellent erosion resistance can be obtained by using as a bonding material a special pitch having an extremely high aromatic content (hereinafter referred to as a "special pitch") obtained by heat treating any hydrocarbon (crude oil, heavy fuel oil, light oil, naphtha etc.), at a temperature of above 700° C. and below 2300° C., preferably 900° to 1600° C. for $1/1000$ to $1/10$ second, and further heat treating the resulting tarry material at a temperature of 150° to 550° C., for more than 1 minute, preferably from 5 minutes to 5 hours. (See Japanese patent application No. 84,435/67.) When using a special pitch as a bonding material, stable carbonaceous substances survive in the refractory and its durability in a reduction atmosphere at a high temperature is extremely improved.

However, in the case of making a refractory by conventional kneading methods (e.g. powder granules and pitches heated at a temperature above the softening point of pitches and kneaded) using this special aromatic pitch substance kneading and pressure molding is difficult and there are numerous problems in the manufacturing steps.

For example, in the case of using this special pitch substance having a higher softening point than a coal pitch (e.g. above 150° C.), higher kneading temperatures than in the case of a coal pitch are required. When the kneading operation is discontinued, the special pitch substance immediately hardens (hereinafter referred to as "change with elapsed time") so that kneading and molding operations become difficult. Therefore, in spite of providing excellent properties to the refractory as described above, this kind of special pitch substance has not been industrially used.

Accordingly, as a second embodiment of the present invention, special pitch is modified so that kneading-molding is facilitated and an excellent refractory is economically obtained.

In this second embodiment inventors have found that when the above special pitch was added thereto aromatic tars (for example, light tarry substances produced by the above thermal decomposition at a high temperature, coal pitches and tarry fractions, etc.) and kneaded as a powder at a temperature of below its softening point, the change with the time elapsed in discontinuing kneading is not recognized.

SUMMARY OF THE INVENTION

The present invention relates to a process for molding a pitch-powder granule system, and more particularly, to a process for molding a pitch-powder granule system using special pitches as a bonding material.

DETAILED DISCLOSURE OF PREFERRED EMBODIMENT

In the process of this invention the above special pitch is finely pulverized before kneading. It can easily be finely pulverized in comparison with the prior art coal tars and pitches or petroleum tars and asphalts. When the kneading is carried out at a temperature below the softening point of the special pitch, e.g. below 150° C., in the early stage of kneading, uniform blending of powder granules is easily carried out. In the latter stage, a kneaded body having an appropriate viscosity which may be easily molded is obtained.

In the above kneading operation in the second embodiment, when less than 70%, by weight, preferably less than 50% by weight, based on the above special pitch, of aromatic tar (as described above) is heated to melting and added to the special pitch, the kneading temperature can be reduced to ordinary temperatures. Thus kneading and molding at ordinary temperatures becomes possible and such has great economical significance. In the process of this invention, the kneading effect upon adding and kneading the special pitch previously dissolved in heated and molten aromatic tar to powder granules is the same as adding and kneading heated and molten aromatic tar to powder granules previously mixed with the special pitch as a powder.

In the above manufacturing process it is desirable to carry out a heat treatment for removing light oil fractions contained in the molding thus formed by evaporation or heating.

The ratio of the above special pitch materials and powder granules may be varied within the range of 1 to 30%, by weight, based on the amount of powder granules. The exact amount depends on the nature of the powder granules and particle sizes involved. That is, when the amount of pitch is over 30%, softening in the heating step of the molding results, and the molding is occasionally deformed or cracked. When the amount is below 1%, such amount is insufficient as a bonding material, and a molding of good quality cannot be obtained.

The present invention and its effect is illustrated by the following examples.

A special pitch (softening point 200° C.) obtained by heat treating a tarry substance at 350° C. for 1 hour, which was obtained by heat treating petroleum naphtha at 1250° C. for 0.002 second, was added to and kneaded with a dolomite refractory blend according to the following two methods:

(1) The kneading temperature was adjusted to 100° to 110° C., below the softening point of the special pitch and 7% by weight of the special pitch was added to the blend of the dolomite refractory.

(2) 6% by weight of the special pitch and 3% by weight of a fused body of coal pitch and anthracene oil, as an aromatic tar, in a ratio of 1:1 were added to a blend of dolomite refractory at a kneading temperature of 50 to 55° C.

The kneading time was 15 minutes, and the molding operation was carried out at a pressure of 600 kg./cm.$^2$. The moldings were further heat treated at 400° C. for 3 hours.

The general properties of dolomite refractories (1) and (2), obtained by the above methods, and conventional tar dolomite refractory are shown in Table 1.

TABLE 1

| | The product of the present invention | | The conventional tar dolomite refractory |
|---|---|---|---|
| | (1) | (2) | |
| Apparent porosity (percent) | 10.5 | 10.3 | 9.3 |
| Water absorption (percent) | 3.6 | 3.5 | 3.3 |
| Bulk density | 2.86 | 2.90 | 2.74 |
| Compressive strength (kg./cm.$^2$) | 460 | 430 | 370 |
| Compressive strength at 1,500° C. (kg./cm.$^2$) | 65 | 60 | 28 |
| Softening point under load $T_2$,° C.* | 1,700 | 1,720 | 1,650 |
| Erosion test: | | | |
| Erosion depth (mm.) | 1 | 1 | 4 |
| Depth of melt loss (mm.) | 0 | 0 | 2 |

*JIS R-2209.

The chemical compositions of the refractories of the present process, (1) and (2), and the conventional article in Table 1 are almost the same as shown by the following:

| | |
|---|---|
| Ig loss | 6.5 |
| $SiO_2$ | 2.4 |
| $Al_2O_3$ | 0.6 |
| $Fe_2O_3$ | 1.3 |
| CaO | 23.7 |
| MgO | 65.5 |

The above erosion test was carried out as follows:

A graphite crucible containing slags of a converter melted at 1600° C. was placed into an electric furnace in a reduction atmosphere at the same temperature, and a refractory specimen cut to a cubic shape of 20 x 20 x 50 mm., after being conditioned to the same temperature in the same atmosphere, was contacted with the surface of the slags in the crucible in the direction of its height (50 mm.). The specimen was hung from the top of the furnace. The erosion time was 5 hours.

As is apparent from the table, the products (1) and (2) of the present invention are high in compressive strength at room and at high temperature, have a good softening point under load and have excellent resistance to erosion by slag.

The powder granules to be used in the present invention include such granules as magnesia powders, calcia powders, chromia powders, etc., in addition to the above dolomite powders, and neutral granules such as thoria powders, ittria powders, alumina powders, etc. are useful. Acidic granules such as silica powders, silica glass powders, mullite powders, etc., powders commonly comprising alumina silicate, and carbon powders (amorphous as well as graphite), silicon carbide powders, boride powders, nitride powders, etc. as an electrode or special refractory, may likewise be used.

What is claimed is:

1. A process for the preparation of a molded pitch-powder refractory product comprising forming an admixture consisting essentially of 1 to 30 parts of a special pitch containing aromatic tar in an amount less than 70% by weight of said special pitch as a fine powder and 100 parts of refractory powder granules to form a kneadable admixture, kneading said admixture at a temperature below the softening point of said special pitch and sufficiently high to form a kneadable admixture, and thereafter pressing and molding the resulting kneaded admixture to form said refractory product, said special pitch being obtained by heat treating a liquid hydrocarbon selected from a group consisting of crude oil, heavy oil, light oil and naphtha at 700 to 2,300° C. for $\frac{1}{1000}$ to $\frac{1}{10}$ second to obtain a tarry material, and thereafter further heat treating the resulting tarry material at 150 to 550° C. for from 1 minute to 5 hours to yield said special pitch.

2. The process of claim 1 wherein said kneading is at a temperature below 150° C.

3. The process of claim 1 wherein the special pitch contains aromatic tar in an amount less than 50% by weight of the special pitch.

4. The process of claim 1 wherein said kneading is at ordinary room temperatures.

5. The process of claim 1 wherein said refractory powder granules are selected from the group consisting of magnesia powders, calcia powders, chromia powders, dolomite powders, thoria powders, ittria powders, alumina powders, silica powders, silica glass powders, mullite powders, alumina silicate powders, carbon powders, silicon carbide powders, boride powders, and nitride powders.

6. The process of claim 5 wherein said refractory powder granules comprise dolomite powders.

7. A molded pitch powder refractory obtained by the process of claim 1.

References Cited

UNITED STATES PATENTS

| 3,070,449 | 12/1962 | Davies et al. | 106—58 |
| 3,168,602 | 2/1965 | Davies et al. | 106—58 |
| 3,253,935 | 5/1966 | Heuer | 106—58 |

JAMES E. POER, Primary Examiner

U.S. Cl. X.R.

106—63